(12) United States Patent
Kuo

(10) Patent No.: US 7,575,361 B2
(45) Date of Patent: Aug. 18, 2009

(54) BACKLIGHT MODULE WITH BUFFERING PROTRUSIONS AND LIQUID CRYSTAL DISPLAY WITH SAME

(75) Inventor: Chao-Tsun Kuo, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 100 days.

(21) Appl. No.: 11/825,863

(22) Filed: Jul. 9, 2007

(65) Prior Publication Data

US 2008/0007972 A1    Jan. 10, 2008

(30) Foreign Application Priority Data

Jul. 7, 2006    (TW) ............................... 95124897 A

(51) Int. Cl.
F21V 7/04    (2006.01)
(52) U.S. Cl. ...................... 362/633; 362/610; 362/615; 362/628; 362/632; 362/634
(58) Field of Classification Search ................. 362/610, 362/615, 628, 632–634
See application file for complete search history.

(56) References Cited

U.S. PATENT DOCUMENTS

| | | | | |
|---|---|---|---|---|
| 5,808,708 | A * | 9/1998 | Oyama et al. | 349/65 |
| 6,961,103 | B2 | 11/2005 | Sung et al. | |
| 2005/0185422 | A1* | 8/2005 | Henriet et al. | 362/615 |
| 2008/0007971 | A1* | 1/2008 | Hsieh | 362/633 |

* cited by examiner

*Primary Examiner*—Stephen F Husar
*Assistant Examiner*—Meghan K Dunwiddie
(74) *Attorney, Agent, or Firm*—Wei Te Chung

(57) ABSTRACT

An exemplary backlight module (11) includes a light guide plate (15) and a frame (16) receiving the light guide plate. The frame includes a plurality, of corners and a plurality of buffering protrusion (168). At least one of the corners is a non-sharp corner, and the buffering protrusions (168) are provided at an outer side of at least one non-sharp corner. The buffering protrusions can absorb most of forces applied to the frame. A liquid crystal display (1) employing the backlight module is also provided.

16 Claims, 5 Drawing Sheets

BACKLIGHT MODULE WITH BUFFERING PROTRUSIONS AND LIQUID CRYSTAL DISPLAY WITH SAME

FIELD OF THE INVENTION

The present invention relates to a backlight module that includes a plurality of buffering protrusions, and to a liquid crystal display (LCD) that includes the backlight module.

GENERAL BACKGROUND

Liquid crystal displays are commonly used as display devices for compact electronic apparatuses, because they not only provide good quality images but are also very thin. Because liquid crystal in a liquid crystal display does not emit any light itself, the liquid crystal requires a light source to clearly and sharply display text and images. Therefore, liquid crystal displays typically need a backlight module.

Referring to FIG. 5, a typical liquid crystal display 5 includes a liquid crystal panel 50, and a backlight module 51 located adjacent to the liquid crystal panel 50. The backlight module 51 includes a first brightness enhancement film (BEF) 52, a second BEF 53, a diffusing film 54, a light guide plate (LGP) 55, a plastic frame 56, and a bottom tray (not shown) arranged generally in that order from top to bottom. The first BEF 52 is located adjacent to the liquid crystal panel 50. The plastic frame 56 fittingly accommodates the liquid crystal panel 50, the first BEF 52, the second BEF 53, the diffusing film 54, and the light guide plate 55 therein. Referring also to FIG. 6, the plastic frame 56 includes four corners 562. Outer sides of the corners 562 are essentially rectangular and are planar.

When the liquid crystal display 5 is subjected to vibration or shock during operation or transportation, in general, it is the corners 562 of the frame 56 which first sustain external forces. However, these forces transmit to the liquid crystal panel 50 and the other components of the backlight module 51. When this happens, components such as the liquid crystal panel 50 and the light guide plate 55 are liable to sustain damage or be displaced. Thus, the optical performance and reliability of the liquid crystal display 1 may be seriously impaired.

What is needed, therefore, is a backlight module that can overcome the above-described deficiencies. What is also needed is a liquid crystal display employing such a backlight module.

SUMMARY

In one preferred embodiment, a backlight module includes a light guide plate and a frame receiving the light guide plate. The frame includes a plurality of corners and a plurality of buffering protrusion. At least one of the corners is a non-sharp corner, and the buffering protrusions are provided at an outer side of at least one non-sharp corner. The buffering protrusions can absorb most of forces applied to the frame. A liquid crystal display employing the backlight module is also provided.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale. The emphasis is, instead, placed upon clearly illustrating the principles of different embodiments of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
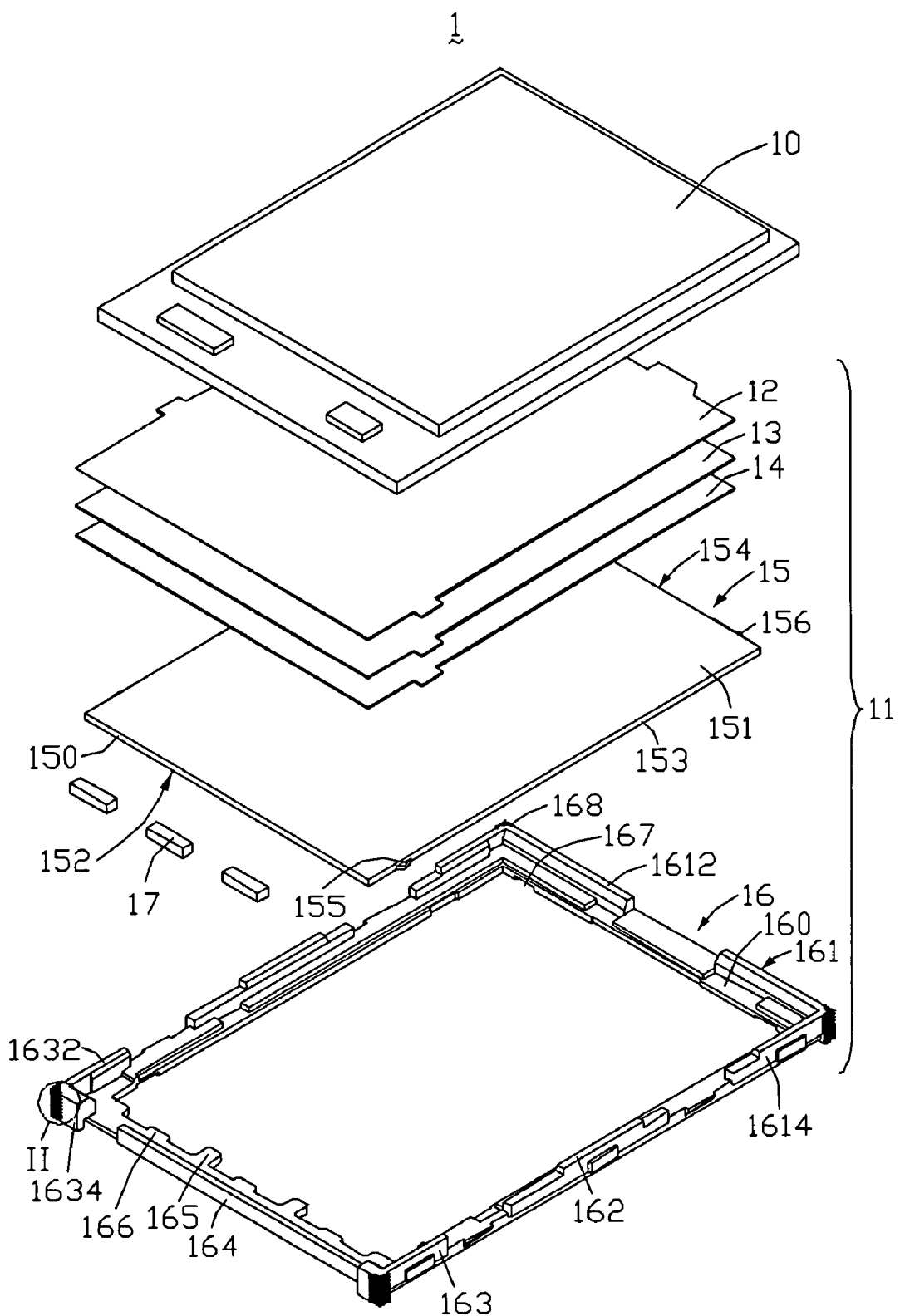
FIG. 1 is an exploded, isometric view of a liquid crystal display according to a first embodiment of the present invention.

Referring to FIG. 1, a liquid crystal display 1 according to, a first embodiment of the present invention is shown. The liquid crystal display 1 includes a liquid crystal panel 10, and a backlight module 11 adjacent to an underside of the liquid crystal panel 10.

The backlight module 11 includes a first BEF 12, a second BEF 13, a diffusing film 14, a light guide plate 15, a frame 16, and a bottom tray (not shown) arranged generally in that order from top to bottom. The backlight module 11 further includes three light emitting diodes (LEDs) 17 serving as light sources. The LEDs 17 are located adjacent to a light incident surface 150 of the light guide plate 15.

The light guide plate 15 further includes a light emitting surface 151 perpendicularly connected with the light incident surface 150, a bottom surface 152 opposite to the light emitting surface 151, two opposite first side surfaces 153 perpendicularly connected with the light incident surface 150, and a second side surface 154 opposite to the light incident surface 150. That is, the light incident surface 150, the first side surfaces 153, and the second side surface 154 are between the light emitting surface 151 and the bottom surface 152. The diffusing film 14 is disposed adjacent to the light emitting surface 151 of the light guide plate 15. Two first ears 155 outwardly extend from the first side surfaces 153, respectively. The first ears 155 are at end portions (not labeled) of the respective first side surfaces 153 which are adjacent to the light incident surface 150. Two second ears (only one visible) 156 outwardly extend from the second side surface 154. The second ears 156 are at corresponding end portions (not labeled) of the second side surface 154, respectively. The light guide plate 15 can be made from polycarbonate (PC) or polymethyl methacrylate (PMMA), and can be manufactured by an injection molding method.

The frame 16 includes a spacing board 160, a first side wall 161, two opposite second side walls 162, two opposite third side walls 163, and a fourth side wall 164. The spacing board 160 is generally frame-shaped. The first side wall 161, the second side walls 162, the third side walls 163, and the fourth side wall 164 integrally extend from the spacing board 160. In another aspect, the spacing board 160 can be considered to perpendicularly extend inward from inner surfaces (not labeled) of the first side wall 161, the second side walls 162, the third side walls 163, and the fourth side wall 164. Thus the frame 16 defines a generally rectangular space (not labeled)

for accommodating the liquid crystal panel 10, the first BEF 12, the second BEF 13, the diffusing film 14, and the light guide plate 15. A plurality of steps (not labeled) are defined on the spacing board 160 at the space.

Two first protrusions 165 and three second protrusions 166 are formed at an inner surface (not labeled) of the spacing board 160 at the fourth side wall 164. The first protrusions 165 and the second protrusions 166 extend into the space, are parallel to each other, and are alternately arranged. The second protrusions 166 are shorter than the first protrusions 165, whereby three recesses (not labeled) are defined at the second protrusions 166 respectively. The light emitting diodes 17 can be respectively disposed in the recesses. In particular, the light emitting diodes 17 can be arranged to abut the second protrusions 166 respectively. The frame 16 further defines four notches 167 positioned at three inner sides (not labeled) of the spacing board 160 respectively. Each notch 167 is located corresponding to a respective one of the first ears 155 or a respective one of the second ears 156 of the light guide plate 15. That is, the first ears 155 and the second ears 156 can be received in the notches 167 respectively. The frame 16 is preferably made from polycarbonate, another plastic, or another suitable material.

The first side wall 161 has a generally symmetrical U-shape, and includes a first arm 1612 and two opposite second arms 1614. The first arm 1612 extends along a corresponding short side of the spacing board 160. The second arms 1614 integrally extend perpendicularly from opposite ends of the first arm 1612 along two opposite long sides of the spacing board 160 which connect with the short side. Each second side wall 162 is generally bar-shaped, and is aligned with a respective one of the second arms 1614. Each third side wall 163 has a generally asymmetrical L-shape, and includes a third arm 1632 and a fourth arm 1634. The third arm 1632 extends along the corresponding long side of the spacing board 160, and is aligned with a respective one of the second side walls 162. The fourth arm 1634 extends along a corresponding short side of the spacing board 160. The fourth side wall 164 is connected with only one of the fourth arms 1634. That is, an opening (not labeled) is defined between the fourth side wall 164 and the other fourth arm 1634. The first, second, third and fourth arms 1612, 1614, 1632, 1634 cooperatively facilitate correct and stable positioning of the liquid crystal panel 10, the first BEF 12, the second BEF 13, the diffusing film 14, the light guide plate 15 in the frame 16.

The first arms 1612 and the second arms 1614 of the first side wall 161 cooperatively form two opposite first corners (not labeled), the third arms 1632 and the fourth arms 1634 of the third side walls 163 cooperatively form two opposite second corners (not labeled), and outer sides of the first and second corners are generally arc-shaped. The frame 16 further includes a plurality of elastic buffering protrusions 168 formed at the outer sides of the first and second corners. In one alternative embodiment, the outer sides of the first and second corners can be generally arcuate or generally curved. In another alternative embodiment, the outer sides of the first and second corners can be flat. In such case, the outer sides of the first corners and oriented obliquely relative to the corresponding first and second arms 1612, 1614; and the outer sides of the second corners and oriented obliquely relative to the corresponding third and fourth arms 1632, 1634.

Figure 2:
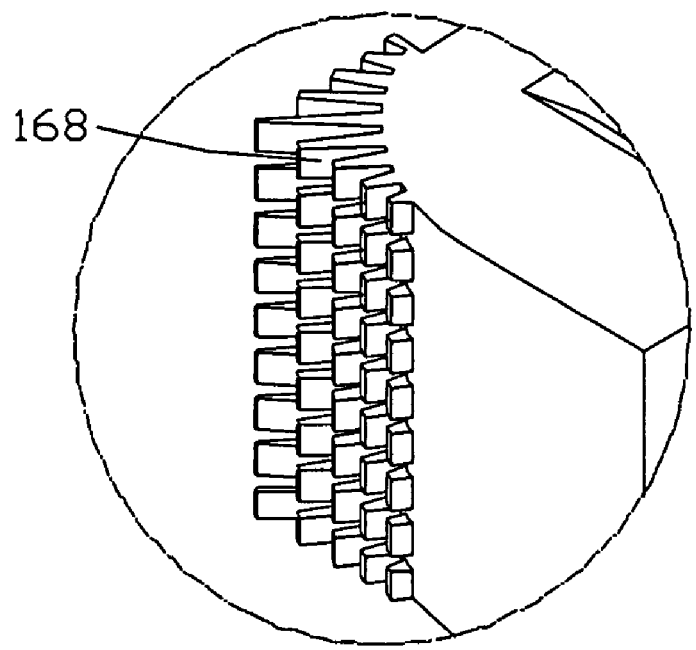
FIG. 2 is an enlarged view of a circled portion II of FIG. 1, showing a plurality of buffering protrusions.
Figure 3:
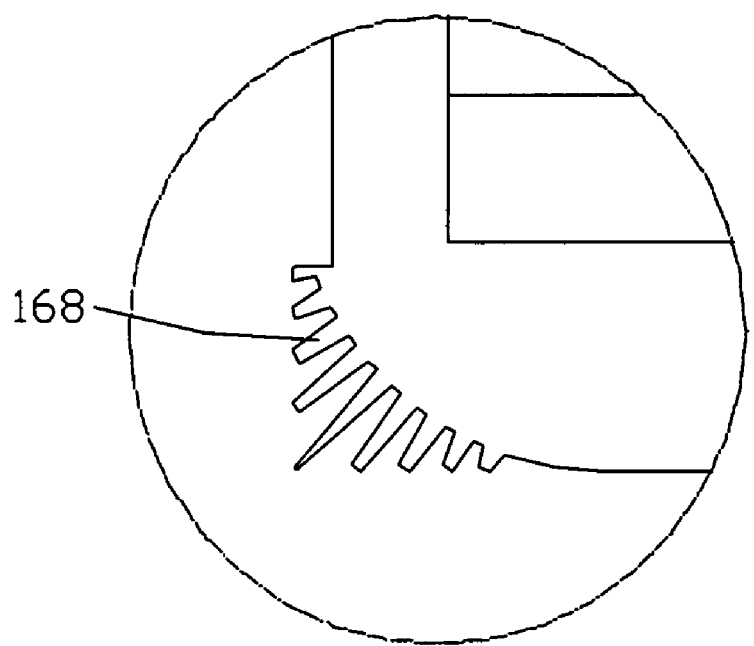
FIG. 3 is similar to FIG. 2, but is a top plan view showing the buffering protrusions.

Referring also to FIG. 2 and FIG. 3, the buffering protrusions 168 at one of the second corners are shown. The buffering protrusions 168 perpendicularly extend from the outer side of each of the first and second corners. At each corner, the buffering protrusions 168 are arrayed in the form of a matrix. When viewed from above, the buffering protrusions 168 taper from the respective first or second corner to free ends thereof. Each buffering protrusion 168 has flat vertical and horizontal sides, and a flat free end. A transverse cross-section of each buffering protrusion 168 is rectangular. The matrix can be considered to include a plurality of horizontal rows and a plurality of vertical columns. Each two adjacent buffering protrusions 168 in each row are separate from each other, and each two adjacent buffering protrusions 168 in each column are separate from each other. The buffering protrusions 168 in any given column are the same. The buffering protrusions 168 in a centermost column are longest. The buffering protrusions 168 in the other columns progressively decrease in length from the centermost column to each of the endmost columns at each of opposite sides of the matrix buffering protrusion.

In the illustrated embodiment, outmost extremities (not labeled) of all the buffering protrusions 168 in the centermost column through to a right-side endmost column are substantially coplanar with an outer surface of the corresponding fourth arm 1634. Outmost extremities (not labeled) of all the buffering protrusions 168 in the centermost column through to a left-side endmost column are substantially coplanar with each other, and can be considered to cooperatively define an imaginary outer plane (not labeled). The imaginary outer plane is parallel to an outer surface of the corresponding third arm 1632, and slightly offset in an outward direction from the outer surface of the third arm 1632. The buffering protrusions 168 can be integrally formed as part of the frame 16. Thus, the buffering protrusions 168 can be made from polycarbonate, another plastic, or another suitable material. In general, the buffering protrusions 168 are elastically deformable. The buffering protrusions 168 at each second corner are arranged symmetrically relative to the buffering protrusions 168 at the other second corner. The buffering protrusions 168 at each first corner are arranged symmetrically relative to the buffering protrusions 168 at the other first corner, and are arranged symmetrically relative to the buffering protrusions 168 at the corresponding nearest second corner.

In a first alternative embodiment, the outmost extremities of all the buffering protrusions 168 in the centermost column through to the right-side endmost column can be considered to cooperatively define an imaginary outer plane (not labeled). The imaginary outer plane is parallel to the outer surface of the fourth arm 1634, and slightly offset in an outward direction from the outer surface of the fourth arm 1634. The outmost extremities of all the buffering protrusions 168 in the centermost column through to the left-side endmost column are substantially coplanar with the outer surface of the third arm 1632.

In a second alternative embodiment, the outmost extremities of all the buffering protrusions 168 in the centermost column through to the right-side endmost column are substantially coplanar with the outer surface of the fourth arm 1634. The outmost extremities of all the buffering protrusions 168 in the centermost column through to the left-side endmost column are substantially coplanar with the outer surface of the third arm 1632.

In a third alternative embodiment, the outmost extremities of all the buffering protrusions 168 in the centermost column through to the right-side endmost column can be considered to cooperatively define a first imaginary outer plane (not labeled). The first imaginary outer plane is parallel to the outer surface of the fourth arm 1634, and slightly offset in the outward direction from the outer surface of the fourth arm 1634. The outmost extremities (not labeled) of all the buffering protrusions 168 in the centermost column through to the left-side endmost column can be considered to cooperatively define a second imaginary outer plane (not labeled). The second imaginary outer plane is parallel to the outer surface of the third arm 1632, and slightly offset in the outward direction from the outer surface of the third arm 1632.

Assembly of the liquid crystal display 1 is as follows. The liquid crystal panel 10, the first BEF 12, the second BEF 13, the diffusing film 14, the light guide plate 15, and the light emitting diodes 17 are received in the frame 16. The frame 16 is further received in the bottom tray. The first ears 155 and the second ears 156 are respectively received in the first and second notches 167.

With the above-described configuration, when the liquid crystal display 1 is subjected to vibration or shock during operation or transportation, the buffering protrusions 168 can elastically deform and rebound. Thereby, the buffering protrusions 168 can absorb much or most of external forces that act on the frame 16. Thus, the components of the liquid crystal display 1 are protected from being damaged, and the optical performance and reliability of the liquid crystal display 1 are improved.

Figure 4:
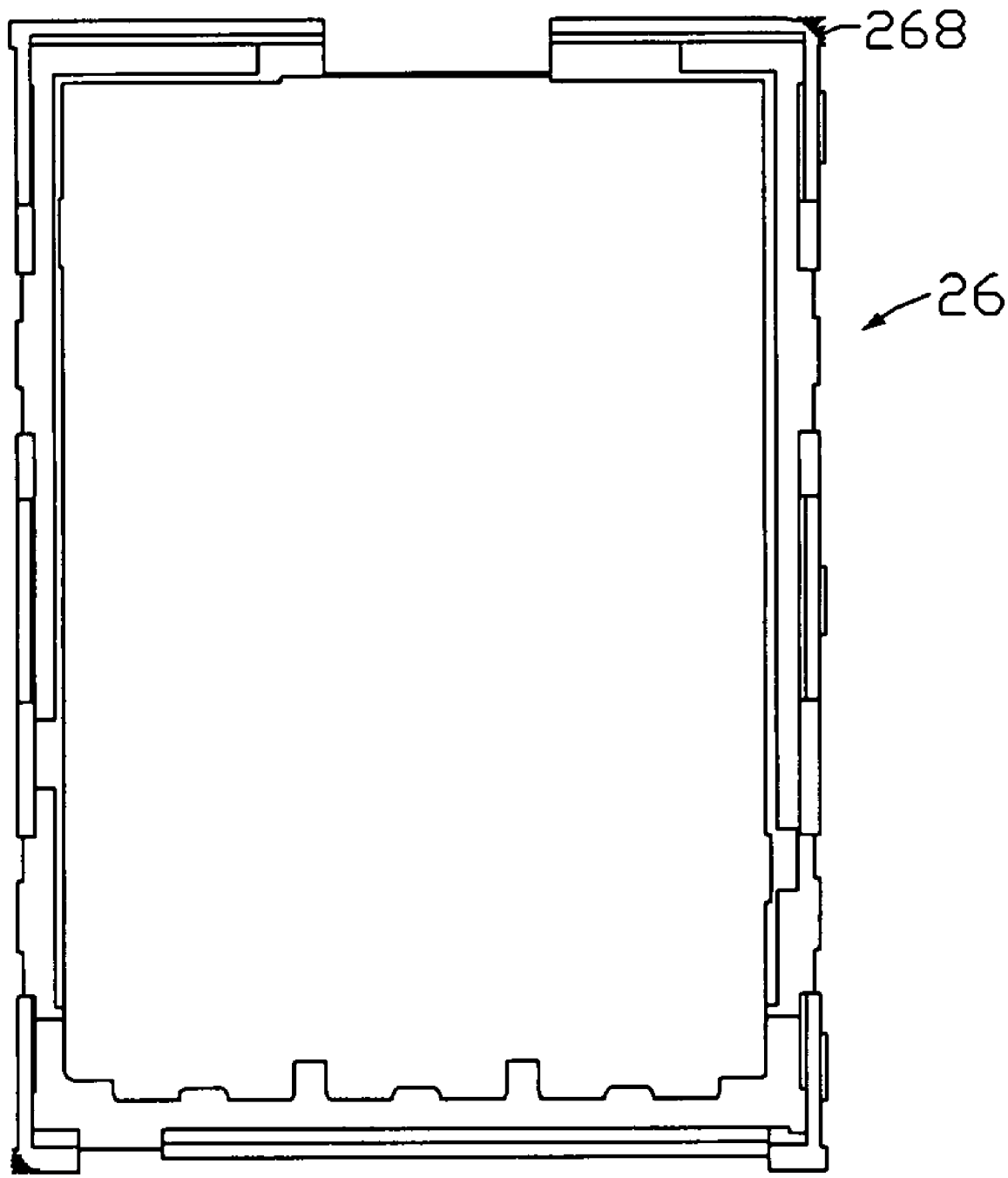
FIG. 4 is a top plan view of a frame of a liquid crystal display according to a second embodiment of the present invention.
Figure 5:
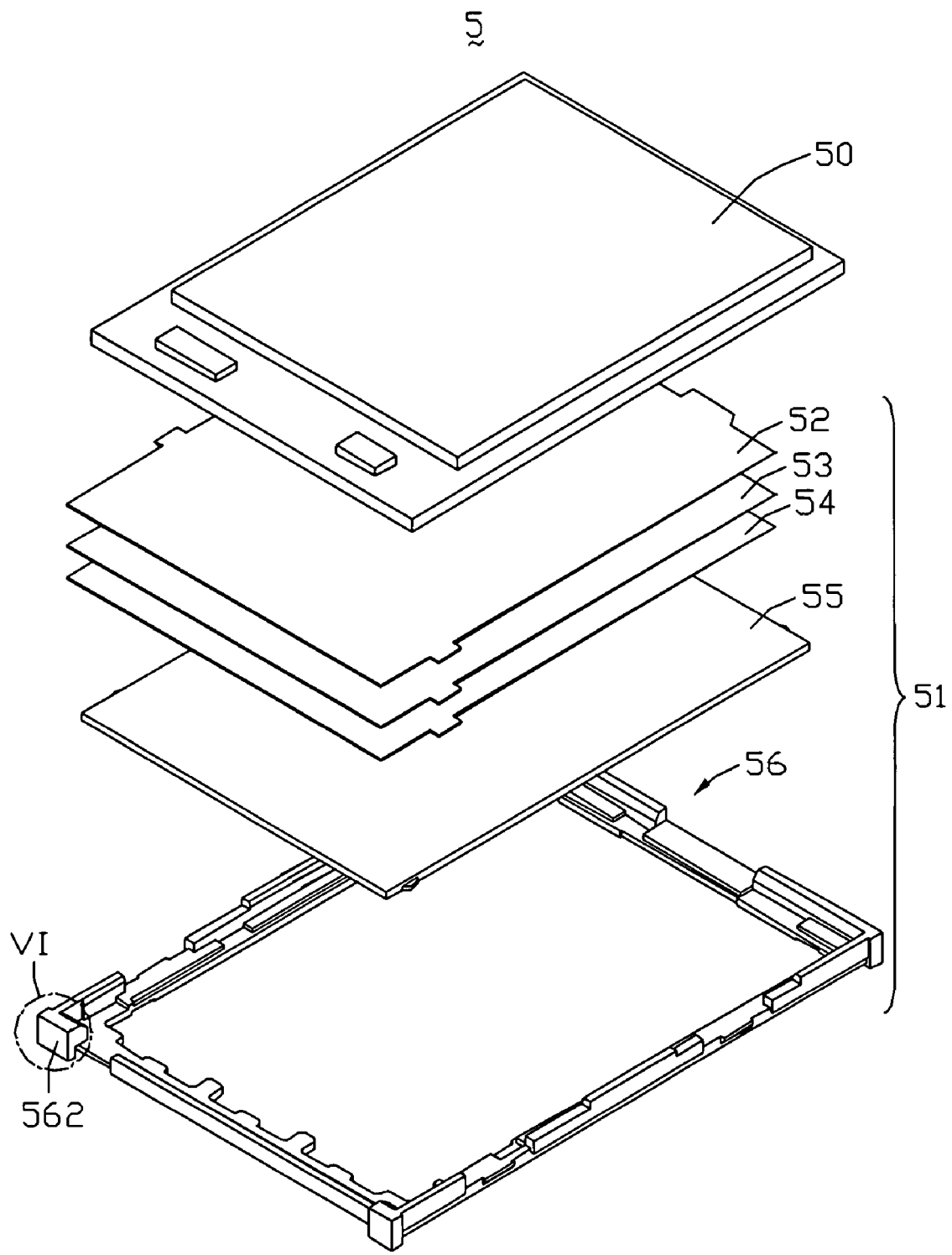
FIG. 5 is an exploded, isometric view of a conventional liquid crystal display.
Figure 6:
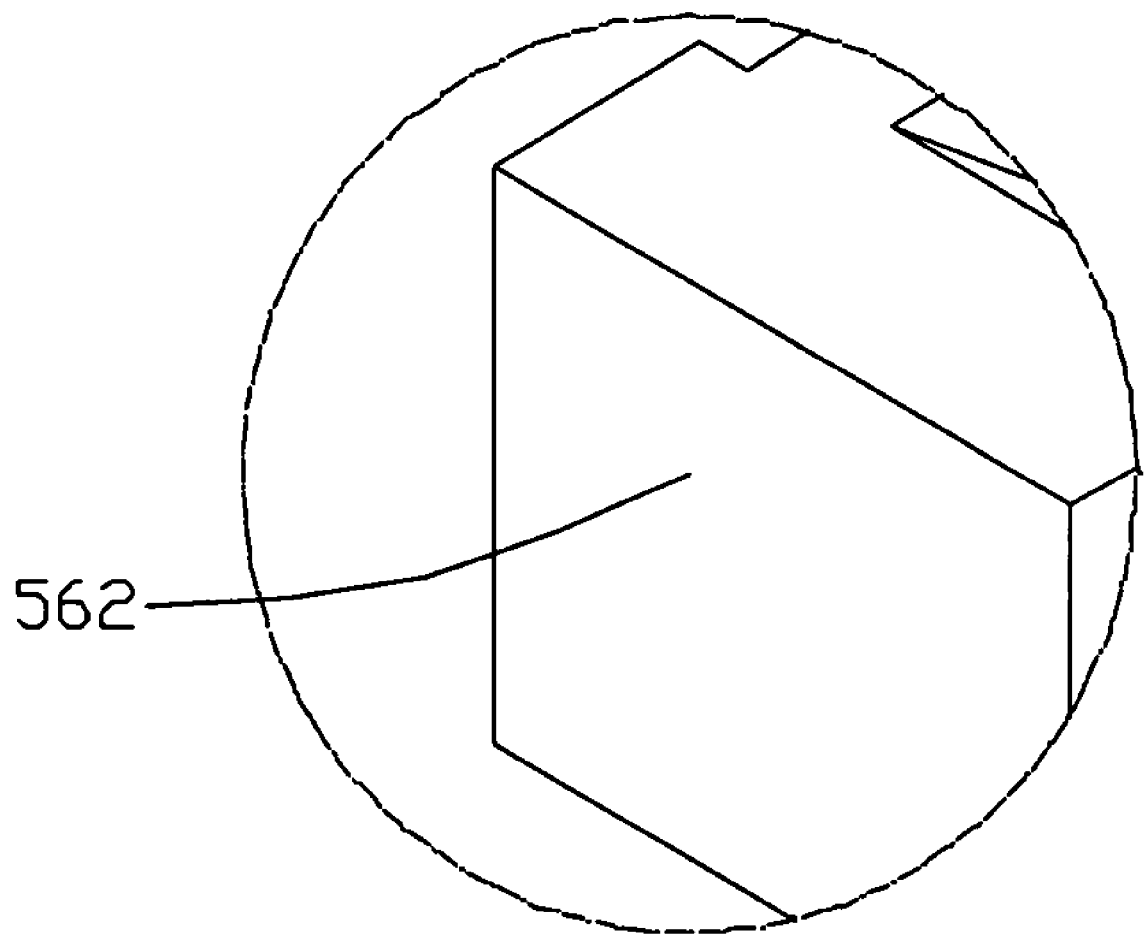
FIG. 6 is an enlarged view of a circled portion VI of FIG. 5.

Referring to FIG. 4, a liquid crystal display 2 according to a second embodiment of the present invention is similar to the liquid crystal display 1. However, the liquid crystal display 2 includes a frame 26. The frame 26 includes a plurality of buffering protrusions 268 that outwardly extend from outer sides of two diagonally opposite corners (not labeled) thereof. The liquid crystal display 2 has advantages similar to those described above in relation to the liquid crystal display 1.

Further or alternative embodiments may include the following. In a first example, the liquid crystal display 1, 2 includes the buffering protrusions 168, 268 at only one of the corners of the frame 16, 26. In a second example, the liquid crystal display 1, 2 includes the buffering protrusions 168, 268 at three of the corners of the frame 16, 26. In a third example, the buffering protrusions 168, 268 have random lengths. In a fourth example, each of the buffering protrusions 168, 268 has one of the following transverse cross-sections: triangular, trapezoidal, pentagonal, hexagonal, or another suitable shape. In a fifth example, at least one of the following parts of each buffering protrusion 168, 268 is curved: the vertical side, the horizontal side, and the free end. The curvature can be generally concave or generally convex. In a sixth example, each two adjacent buffering protrusions 168, 268 in each row adjoin each other at the corresponding corner of the frame 16, 26. In a seventh example, the buffering protrusions 168 outwardly extend from the outer sides of at least one of the following parts of the frame 16: the outer side of the third arm 1632, the outer side of the fourth arm 1634, an outer side of the first arm 1612, an outer side of the second arm 1614, an outer side of the first side wall 161, an outer side of each of the second side walls 162, an outer side of each of the third side walls 163, and an outer side of the fourth side wall 164.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a light guide plate; and
   a frame receiving the light guide plate, the frame comprising:
   a plurality of corners, at least one of which is a non-sharp corner; and
   a plurality of buffering protrusions provided at an outer side of at least one of the at least one non-sharp corner; wherein the buffering protrusions taper from the at least one non-sharp corner to free ends thereof, when the buffering protrusions are viewed along a direction perpendicular to the frame.

2. The backlight module as claimed in claim 1, wherein the at least one non-sharp corner has a configuration selected from the group consisting of: generally arcuate, generally curved, and flat.

3. The backlight module as claimed in claim 1, wherein the buffering protrusions perpendicularly extend from the outer side of the at least one non-sharp corner of the frame.

4. The backlight module as claimed in claim 1, wherein all of the corners of the frame are non-sharp, and the buffering protrusions are provided at the outer sides of each non-sharp corner of the frame.

5. The backlight module as claimed in claim 1, wherein two diagonally opposite of the corners of the frame are non-sharp, and the buffering protrusions are provided at the outer sides of the diagonally opposite non-sharp corners of the frame.

6. The backlight module as claimed in claim 1, wherein each buffering protrusion comprises a plurality of flat sides and a flat free end.

7. The backlight module as claimed in claim 6, wherein each buffering protrusion has a transverse cross-section with a shape selected from the group consisting of: rectangular, triangular, trapezoidal, pentagonal, and hexagonal.

8. The backlight module as claimed in claim 1, wherein the buffeting protrusions are elastically deformable.

9. The backlight module as claimed in claim 1, wherein the buffering protrusions are integrally formed as part of the frame.

10. A backlight module comprising:
    a light guide plate; and
    a frame receiving the light guide plate, the frame comprising:
    a plurality of corners, at least one of which is a non-sharp corner; and
    a plurality of buffering protrusions provided at an outer side of at least one of the at least one non-sham corner, wherein the buffering protrusions are arrayed in the form of a matrix having a plurality of rows and columns, each two adjacent buffering protrusions in each column being separate from each other, the buffering protrusions in any one column having the same configuration, and the buffering protrusions in a centermost column being longest.

11. The backlight module as claimed in claim 10, wherein each two adjacent buffering protrusions in each row are separate from each other.

12. The backlight module as claimed in claim 10, wherein the buffering protrusions progressively decrease in length from the centermost column to each of endmost columns at each of opposite sides of the matrix buffering protrusion.

13. The backlight module as claimed in claim 10, wherein the frame comprises a first arm and a second arm, and the first arm and the second arm cooperatively define the at least one non-sharp corner.

14. The backlight module as claimed in claim 13, wherein the buffering protrusions have at least one of the following configurations: outmost extremities of all the buffering protrusions in the centermost column through to a left-side endmost column are substantially coplanar with an outer surface of the first arm; and outmost extremities of all the buffering protrusions in the centermost column through to a right-side endmost column are substantially coplanar with an outer surface of the second arm.

15. The backlight module as claimed in claim 13, wherein the buffering protrusions have at least one of the following configurations: outmost extremities of all the buffering protrusions in the centermost column through to a right-side endmost column are substantially coplanar with each other, and cooperatively define an imaginary outer plane, with the imaginary outer plane being parallel to and slightly offset in an outward direction from an outer surface of the second arm; and outmost extremities of all the buffering protrusions in the centermost column through to a left-side endmost column are substantially coplanar each other, and cooperatively define an imaginary outer plane, with the imaginary outer plane being parallel to and slightly offset in an outward direction from an outer surface of the first arm.

16. A liquid crystal display comprising:
a liquid crystal panel; and
a backlight module adjacent to the liquid crystal panel, the backlight module comprising:
  a light guide plate; and
  a frame receiving the light guide plate, the frame comprising:
    a plurality of corners, at least one of which is a non-sharp corner; and
    a plurality of buffering protrusions provided at an outer side of at least one of the at least one non-sharp corner;
wherein the buffering protrusions taper from the at least one non-sharp corner to free ends thereof, when the buffering protrusions are viewed along a direction perpendicular to the frame.

* * * * *